(12) United States Patent
Bosman

(10) Patent No.: US 12,178,675 B2
(45) Date of Patent: *Dec. 31, 2024

(54) DUAL-STIFFNESS BRACKET FOR ELECTRIC TOOTHBRUSH WITH BRUSHING FORCE SENSOR ASSEMBLY

(71) Applicant: KONINKLIJKE PHILIPS N.V., Eindhoven (NL)

(72) Inventor: Franciscus Jozef Bosman, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,317

(22) Filed: Jul. 26, 2023

(65) Prior Publication Data

US 2023/0363871 A1 Nov. 16, 2023

Related U.S. Application Data

(63) Continuation of application No. 17/055,156, filed as application No. PCT/EP2019/062004 on May 10, 2019, now Pat. No. 11,744,688.

(Continued)

(51) Int. Cl.
*A61C 17/22* (2006.01)
*A46B 5/00* (2006.01)
(Continued)

(52) U.S. Cl.
CPC .......... *A61C 17/221* (2013.01); *A46B 5/0037* (2013.01); *A46B 13/02* (2013.01); *A46B 15/0012* (2013.01); *G01L 1/122* (2013.01)

(58) Field of Classification Search
CPC ... A46B 13/02; A46B 15/0012; A46B 5/0037; A61C 17/16; A61C 17/22; A61C 17/221; A61C 17/34
See application file for complete search history.

(56) References Cited

U.S. PATENT DOCUMENTS

| 5,378,153 A | 1/1995 | Giuliani et al. |
| 2003/0131427 A1 | 7/2003 | Hilscher et al. |

(Continued)

FOREIGN PATENT DOCUMENTS

| CN | 206777411 U | 12/2017 |
| EP | 3092973 A1 | 11/2016 |
| WO | 2008053455 A1 | 5/2008 |

OTHER PUBLICATIONS

International Search Report and Written Opinion, International Application No. PCT/EP2019/062004, Mailed on Jun. 19, 2019.

*Primary Examiner* — Shay Karls

(57) ABSTRACT

An electric toothbrush (10) and method of operating an electric toothbrush. The electric toothbrush includes a handle portion (14) having a shaft (38) configured to receive a brushing load from a bristled end (18) of a brush head (12). A sensor assembly (30) is configured to determine a deflection proportional to the brushing load with respect to a first direction (24) associated with the brushing load. The sensor assembly includes an air gap (32) and is configured to determine the deflection based on changes in the air gap. A mounting bracket (50) is connected between opposite sides of the air gap, the mounting bracket having a first bending stiffness with respect to the first direction, and a second bending stiffness with respect to a second direction (28) generally opposite to the first direction. The first bending stiffness is greater than the second bending stiffness.

15 Claims, 5 Drawing Sheets

Related U.S. Application Data

(60) Provisional application No. 62/671,462, filed on May 15, 2018.

(51) Int. Cl.
*A46B 13/02* (2006.01)
*A46B 15/00* (2006.01)
*G01L 1/12* (2006.01)

(56) References Cited

U.S. PATENT DOCUMENTS

| | | |
|---|---|---|
| 2014/0060975 A1 | 3/2014 | Kloster et al. |
| 2015/0230898 A1 | 8/2015 | Miller et al. |
| 2016/0015492 A1 | 1/2016 | Skaanland et al. |
| 2017/0027674 A1 | 2/2017 | Kleppen |

DUAL-STIFFNESS BRACKET FOR ELECTRIC TOOTHBRUSH WITH BRUSHING FORCE SENSOR ASSEMBLY

CROSS-REFERENCE TO PRIOR APPLICATIONS

This application is a continuation of U.S. application Ser. No. 17/055,156, filed on Nov. 13, 2020, which is a U.S. National Phase application under 35 U.S.C. § 371 of International Application No. PCT/EP2019/062004, filed on May 10, 2019, which claims the benefit of U.S. Provisional Patent Application No. 62/671,462, filed on May 15, 2018. These applications are hereby incorporated by reference herein.

FIELD OF THE INVENTION

The present disclosure is directed generally to electric toothbrushes and more particularly to electric toothbrushes having a sensor assembly configured to determine a brushing force via a deflection in the toothbrush.

BACKGROUND

It has been shown that exerting too much force during brushing may damage a user's tooth enamel or gums. For this reason, some electrical toothbrushes are provided with a brushing force or pressure sensor to indicate to user's when the user is brushing too hard. Some force sensors indirectly measure force by measuring a deflection in one or more components of the toothbrush. However, the toothbrush should also be able to withstand being dropped (e.g., from a height of one to two meters onto a countertop or floor) and some of the components of the toothbrush, including the force sensor may be susceptible to damage in response to large forces.

Accordingly, there is a continued need in the art for a toothbrush assembly that both permits brushing force to be determined and protects internal parts from undesirably high forces in case of unplanned impacts.

SUMMARY OF THE INVENTION

The present disclosure is directed to inventive apparatuses for electric toothbrushes. According to the embodiments herein, an electric toothbrush includes a mounting bracket that is compliant in response to torque in a first direction with respect to drop loads applied to the toothbrush, and relatively stiff in response to torque in a second direction with respect to brushing loads applied by the user. The toothbrush can be arranged such that the first and second directions are opposite to each other. The bracket may include a first leg and a second leg arranged generally in an L-shape. The bracket may include one or more arms that extend transversely from the first leg to the second leg for providing dual-stiffness functionality. The arm may include a hook that is engageable with a boss on the second leg for preventing relative rotation of the first and second legs in response to brushing loads, while permitting relative rotation of the first and second legs in response to drop loads. Alternatively, the arm may be configured to buckle in response to torque applied due to the drop loads, such as by including an outward bowing, bulge, or bending in the arm.

Generally, in one aspect, an electric toothbrush is provided. The electric toothbrush includes a handle portion having a shaft configured to receive a brushing load from a bristled end of a brush head; a sensor assembly configured to determine a deflection proportional to the brushing load with respect to a first direction associated with the brushing load, the sensor assembly including an air gap and configured to determine the deflection based on changes in the air gap; and a mounting bracket connecting between opposite sides of the air gap, the mounting bracket configured with a first bending stiffness with respect to the first direction, and a second bending stiffness with respect to a second direction substantially opposite to the first direction, wherein the first bending stiffness is greater than the second bending stiffness.

In one embodiment, the sensor assembly includes a magnet and magnetic laminations on opposite sides of the air gap configured to create a magnetic field, wherein the brushing load is determinable based on changes in the magnetic field.

In one embodiment, the electric toothbrush further includes a back-iron component adjacent to the magnet configured to conduct the magnetic field. In one embodiment, the back-iron component is arranged as a flat plate or as an L-shaped component with a weakened bend.

In one embodiment, the electric toothbrush further includes a compliant element configured to control an amount of the deflection in response to the brushing load. In one embodiment, the compliant element includes a V-spring. In one embodiment, the mounting bracket is configured to attenuate forces applied to the mounting bracket in the second direction to protect a connection of the mounting bracket to the compliant element.

In one embodiment, the mounting bracket includes a first leg coupled to the shaft and a second leg coupled to the compliant element. In one embodiment, the mounting bracket includes one or more arms extending transversely between the first and second legs and a stop configured to prevent relative movement of the first and second legs in the first direction.

In one embodiment, the stop includes a hook formed on the one or more arms that is engageable with a boss extending from the mounting bracket.

In one embodiment, the mounting bracket includes one or more arms extending transversely between the first and second legs, wherein the one or more arms are configured to buckle in response to force applied to the first leg in the second direction. In one embodiment, the one or more arms are bowed outwardly to promote buckling.

Generally, in another aspect, a method of operating an electric toothbrush is provided. The method includes receiving a brushing force at a bristled end of a brush head of the toothbrush, the brushing force causing a deflection in the electric toothbrush with respect to a first direction; measuring the deflection as a change in an air gap by a sensor assembly; and transferring applied forces between opposite sides of the air gap with a mounting bracket connected between the opposite sides of the air gap, wherein the mounting bracket is configured with a first bending stiffness with respect to the first direction, and a second bending stiffness with respect to a second direction generally opposite to the first direction, wherein the first bending stiffness is greater than the second bending stiffness.

In one embodiment, the method further includes controlling an amount of the deflection with a compliant element proportionally in response to the brushing force. In one embodiment, the transferring includes attenuating forces applied to the mounting bracket in the second direction to protect a connection of the mounting bracket to the compliant element.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of electric toothbrushes. More generally, Applicant has recognized and appreciated that it would be beneficial to provide an electric toothbrush that includes a dual-stiffness bracket for providing a first stiffness in response to loads applied due to user brushing that is higher relative to a second stiffness provided in response to loads applied due to dropping the toothbrush. A particular goal of utilization of certain embodiments of the present disclosure is to protect internal components of an electric toothbrush during dropping while permitting a user's brushing force to be determined.

In view of the foregoing, various embodiments and implementations are directed to an electric toothbrush that includes a mounting bracket that is compliant in response to torque in a first direction with respect to drop loads applied to the toothbrush, and relatively stiff in response to torque in a second direction with respect to brushing loads applied by the user. The toothbrush can be arranged such that the first and second directions are opposite to each other. The bracket may include a first leg and a second leg arranged generally in an L-shape. The bracket may include one or more arms that extend transversely from the first leg to the second leg for providing dual-stiffness functionality. The arm may include a hook that is engageable with a boss on the second leg for preventing relative rotation of the first and second legs in response to brushing loads, while permitting relative rotation of the first and second legs in response to drop loads. Alternatively, the arm may be configured to buckle in response to torque applied due to the drop loads, such as by including an outward bowing, bulge, or bending in the arm.

Figure 1:
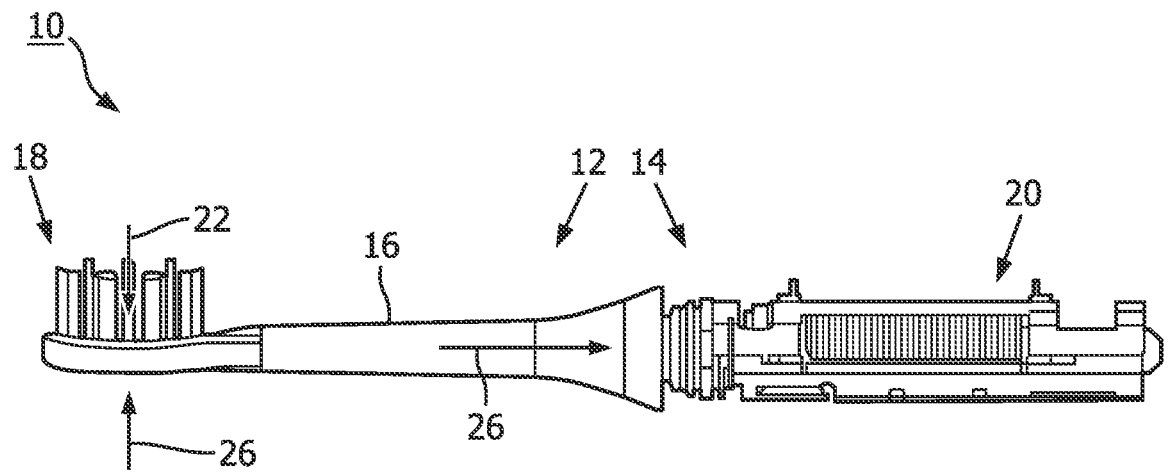
FIG. 1 is a side view of a portion of an electric toothbrush having a brush head and a handle portion according to one embodiment disclosed herein.

Referring to FIG. 1, in one embodiment, an electric toothbrush 10 is provided with a brush head 12 attached to a handle portion 14 (external housing for the handle portion 14 removed from this view to facilitate discussion of the components of the handle portion 14). The brush head 12 includes a neck 16 extending from the handle portion 14 and a bristled end 18 distal from the handle portion 14, e.g., for engaging against and brushing a user's teeth while the toothbrush 10 is in use. For example, the handle portion 14 may include a drive assembly 20 configured to cause vibrations, oscillations, or other movement of the brush head 14 to assist in brushing the user's teeth with the bristled end 18.

During typical use, the brush head 12, due to the user forcibly engaging the bristles of the end 18 against the surface of the user's teeth, will result in a brushing force or load 22 against the brush head as indicated by an arrow in FIG. 1. As discussed in more detail below, the brushing load 22 may result in torque applied to components of the toothbrush 10 in a direction 24 shown in FIG. 2. That is, the neck 16 essentially acts as a lever arm for applying a torque in the direction 24 as a result of the brushing load 22. The toothbrush 10 may, but does not have to, include a sensor assembly 30 to measure a displacement or deflection between selected components of the toothbrush 10, from which the brushing load 22 can be determined. The components of the sensor assembly 30 can be better appreciated from the enlarged view of FIG. 2 (with additional housing support structures removed for clarity), the cross-sectional view of FIG. 3, and the perspective view of FIG. 4, which are discussed in more detail below.

In order to determine the brushing load 22 from the deflection of selected components of the toothbrush 10, the sensor assembly 30 may include or be used in combination with a compliant element with a known compliance profile or constant (e.g., deflecting in known amounts in response to applied loads). In this way, the amount of deflection can be reliably converted into a value for the brushing load 22 based on the known compliance properties of the compliant element. As discussed in more detail below, a high stiffness in the force path that includes the compliant element can be useful to enable the deflection of the compliant element to accurately quantify the brushing load 22, while protecting other components of the toothbrush 10.

Figure 2:
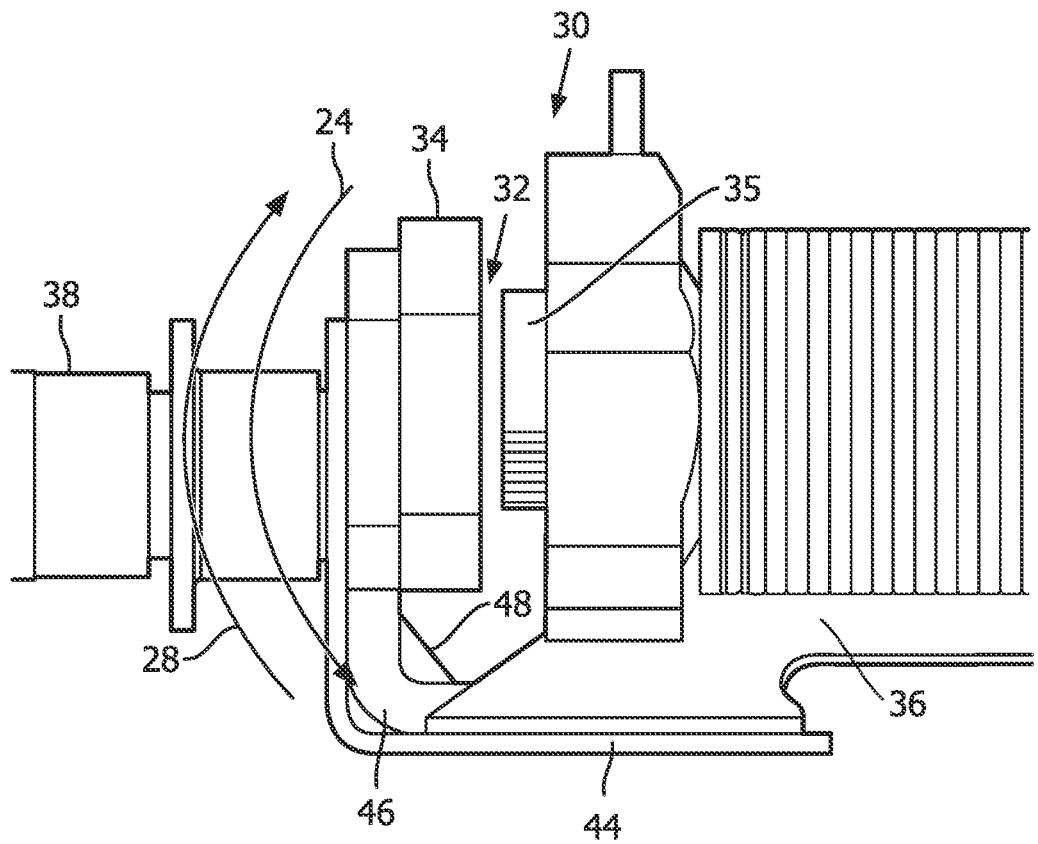
FIG. 2 is an enlarged side view of components of an electric toothbrush related to a sensor assembly for measuring a deflection in the electric toothbrush from which a user's brushing force can be determined.

However, as discussed in more detail below, a high level of stiffness may hinder the ability of the toothbrush 10 to withstand applied forces in other directions, such as, for example, those resulting from the toothbrush 10 being dropped. Arrows are providing in FIG. 1 to represent the directions of drop loads 26, e.g., which may result from the toothbrush being dropped from a hand held position onto a sink, countertop, or floor. The drop loads 26 result in torque applied to components of the toothbrush 10 in a direction 28 (as shown in FIG. 2) generally opposite to the direction 24 for the brushing load 22. The embodiments disclosed herein advantageously attenuate the drop loads 26 to protect vulnerable internal components of the toothbrush 10 from torque in the direction 28 while permitting some degree of deflection in the direction 24 due to the brushing load 22 to be measured, thereby enabling the value of the brushing load 22 to be determined using the sensor assembly 30 while still providing drop protection for the internal components of the toothbrush.

Figure 3:
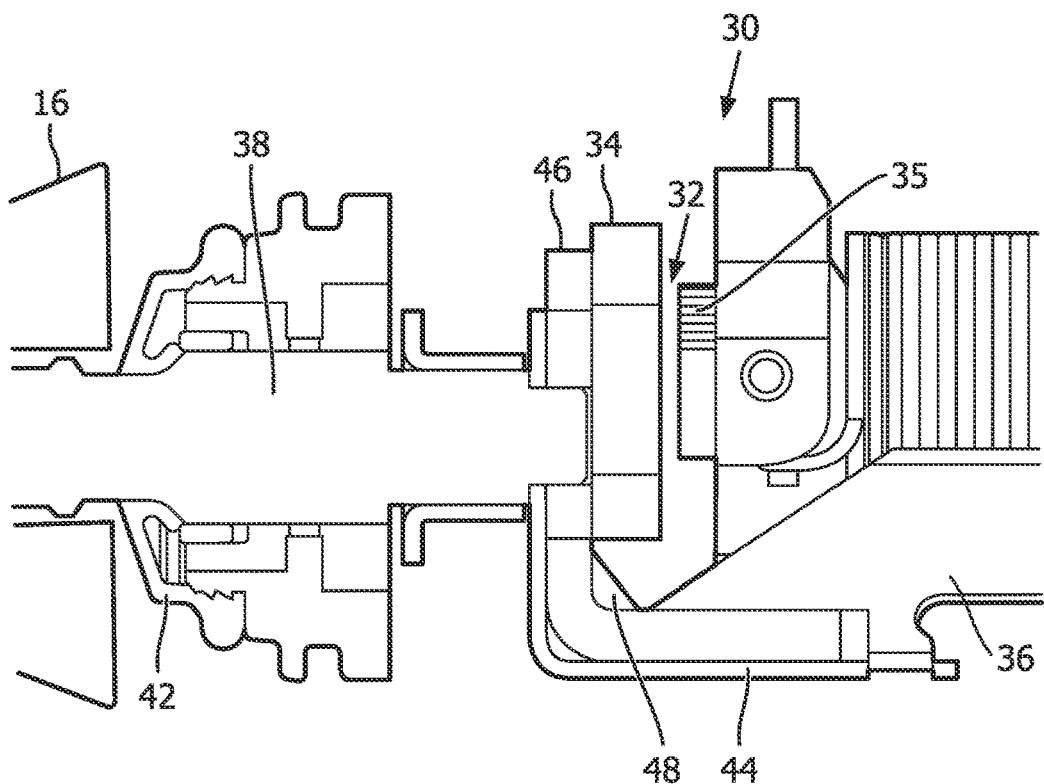
FIG. 3 is a cross-sectional view of a portion of an electric toothbrush related to a sensor assembly for measuring a deflection in the electric toothbrush from which a user's brushing force can be determined.
Figure 4:
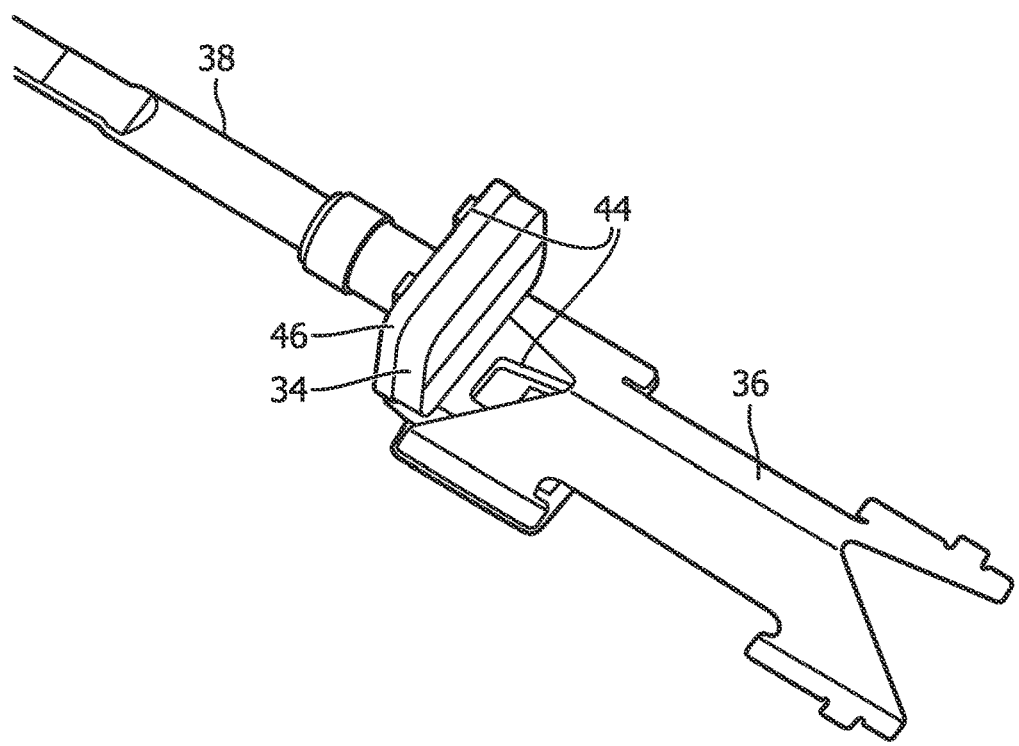
FIG. 4 is a perspective view of a V-spring and various components along a force path in an electric toothbrush.

Displacement, from which the value of the brushing load 22 can be determined, may be measured between opposite sides of an air gap 32, shown best in FIGS. 2-3. That is, in this embodiment, the brushing load 22 results in a widening of the air gap 32 due to deflections of the toothbrush 10, while either of the drop loads 28 results in a narrowing of the air gap 32 due to deflections in the direction 28. In one embodiment, the width of the air gap 32 may be measured to determine the brushing load 22. Additionally or alternatively, the widening of the air gap 32 may be accompanied by a misalignment of the components on opposite side of the air gap 32 in the same direction as the brushing load 22, which can be measured.

As shown in FIGS. 2-3, the sensor assembly 30 includes a magnet 34 and laminations 35 positioned on opposite sides of the air gap 32, and which together produce a magnetic field. Accordingly, displacement of the components on opposite sides of the air gap 32 may be determined from changes in the magnetic field (e.g., from measured changes in current and/or voltage resulting from changes in the magnetic field). In one embodiment, a Hall Effect sensor, positioned on the same side of the air gap 32 as the laminations 35, may be used to determine the displacement based on changes in the magnetic field measured by the sensor as the sensor is moved relative to the magnet 34 while the air gap 32 widens and narrows due to the applied forces. In another embodiment, displacement may be measured by use of a proximity sensor (e.g., infrared, ultrasonic, etc.) mounted on one side of the air gap 32 that senses the distance to a surface on the opposite side of the air gap 32. For example, an optical sensor may be included to measure the distance from one side of the air gap 32 (e.g., the optical sensor mounted to the side with the laminations 35) to a surface on the other side of the air gap 32 (e.g., the surface of the magnet 34 or other component facing the air gap 32). Additionally, similar to that noted above, instead of measuring the width of the air gap 32, any such sensor may measure deflections of components on opposite sides of the air gap 32 in a direction transverse (e.g., substantially perpendicular) to the longitude of the toothbrush 10. For example, an optical sensor could be arranged to measure the displacement of the components with respect to the same direction that the brushing load 22 is being applied (e.g., in a "downward" direction with respect to the orientation of FIGS. 1-3). Those of ordinary skill in the art will recognize other manners for measuring the displacement on opposite sides of an air gap.

As noted above, the toothbrush 10 may include a compliant element that defines a relationship between displacement of the air gap 32 and the value of the applied brushing load 22. For example, a spring or other resilient element with a quantifiable compliance, such as the V-spring 36 in the embodiment of FIGS. 1-4, can be utilized. That is, the V-spring 36 can be selected that deflects a set or known amount in response to different values for the brushing load 22. In this way, the displacement measured by the sensor assembly 30 can be reliably converted into a value for the brushing load 22 based on the known compliance of the V-spring 36. It can be appreciated that other types of elements with quantifiable compliance other than a V-spring can also be used.

Referring particularly to FIG. 3, the inclusion of a seal 42 around the shaft 38 may be used prevent toothpaste, saliva, water, etc. from entering the handle portion 14 if there is displacement of the shaft 38, such as during operation, thereby causing corrosion, degradation, and/or damage of internal components, particularly steel components and electronics.

A mounting bracket 44 may be included that connects the components on opposite sides of the air gap 32 together. More particularly, the bracket 44 in the illustrated embodiment is a substantially L-shaped component that connects to both the shaft 38 and the V-spring 36. The mounting bracket 44 can be included to increase the stiffness of the force path to the V-spring 36, thereby limiting the degree of deflection. A back-iron component 46 for the magnet 34 (e.g., conducting the static magnetic field from the magnet 34) may additionally and/or alternatively be included. Additionally, the back-iron component 46 may optionally include one or more stiffeners 48 to further increase stiffness for preventing deflection.

To protect the handle portion 14 and components therein from the drop impacts 26, it may be beneficial to provide some degree of compliance or flexibility in the mounting bracket 44. For example, a lower stiffness will enable the mounting bracket 44 to more readily move, e.g., to narrow or close the air gap 32, without overloading the connection between the mounting bracket 44 and the V-spring 36. For example, the mounting bracket 44 and the V-spring 36 may be welded together. This, in view of the above and in accordance with the embodiments disclosed herein, it is desirous for the brushing load 22 to be fully communicated through the mounting bracket 44 to the V-spring 36 via a high stiffness in the mounting bracket 44, while a relatively lower stiffness for the mounting bracket 44 is desired with respect to the drop loads 26 in order to protect welds or other affixation mechanism to the V-spring 36.

Figure 5:
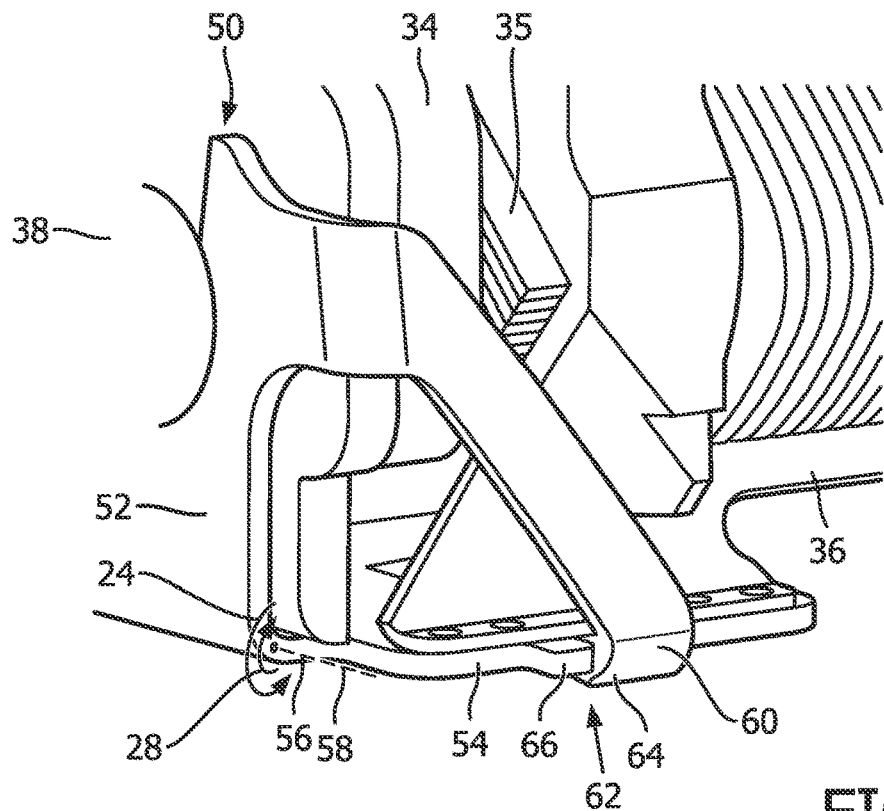
FIG. 5 is a top perspective view of a dual-stiffness bracket installed along a force path within an electric toothbrush according to one embodiment disclosed herein.
Figure 6:
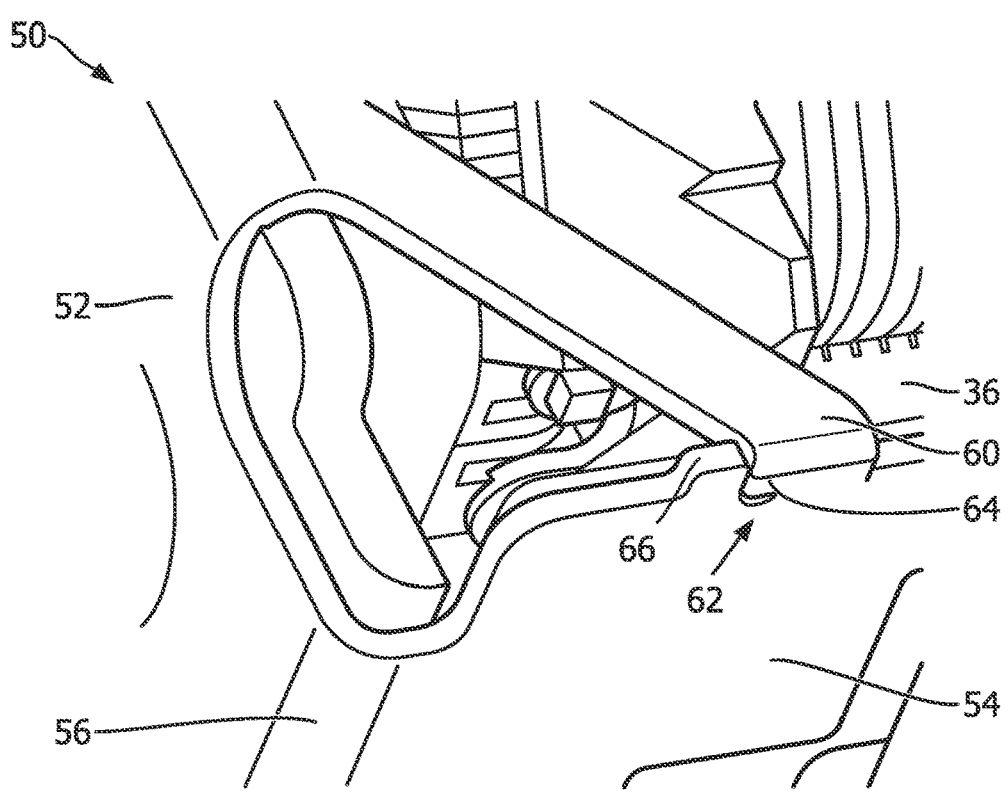
FIG. 6 is a bottom perspective view of a dual-stiffness bracket installed along a force path within an electric toothbrush according to one embodiment disclosed herein.

Accordingly, the relevant portion of the toothbrush is illustrated in FIGS. 5-6 having a dual-stiffness mounting bracket 50 in place of the mounting bracket 44 above. Similar to the mounting bracket 44, the dual-stiffness mounting bracket 50 is a substantially L-shaped component having a first leg 52 (connected to the shaft 38) and a second leg 54 (connected to the V-spring 36). It is to be appreciated that due to the brushing load 22, the first leg 52 and the second leg 54 will be biased toward each other in the first direction 24, while the drop loads 26 will cause the legs 52 and 54 to be biased away from each other in the direction 28. Relative rotation of the legs 52 and 54 may occur at a junction or bend 56 from which the legs 52 and 54 extend from each other. For example, the junction 56 may act akin to a hinge that permits the legs 52 and 54 to resiliently flex with respect to each other about an axis of rotation 58, i.e., thereby changing the angle between the legs 52 and 54.

By dual-stiffness it is meant that the mounting bracket 50 has a first stiffness (or resistance to bending) with respect to the brushing load 22 and deflections in the first direction 24, and second stiffness (or resistance to bending) for the drop loads 26 and deflections in the second direction 28. The mounting bracket 50 can be configured so that the first stiffness (with respect to the first direction 24) is greater than the second stiffness (with respect to the second direction 28). In other words, with respect to the second direction 28, the mounting bracket 50 absorbs at least some of the force, or directs at least some of the applied force along a force path that bypasses or avoids the interface with the V-spring 36, in order to attenuate the forces applied to welds or other connection between the V-spring 36 and the mounting bracket 50 due to the drop loads 26. The dual-stiffness functionality of the mounting bracket 50 may be accomplished by one or more arms 60, e.g., arranged on opposite sides, that extend transversely from the first leg 52 toward the second leg 54.

Each of the arms 60 is only affixed to the first leg 52 (e.g., integrally formed), and thus can move with the first leg 52 relative to the second leg 54. However, the mounting bracket 50 has a stop 62 that prevents or limits relative deflection of the legs 52 and 54 in the direction 24 of the brushing load 22. In this way, the stiffness provided by the mounting bracket 50 is greater with respect to the first direction 24 for the brushing load 22 than the second direction for the drop loads 26. In FIG. 5, the stop 62 is formed by a hook 64 in the arm 60 that is configured to engage with (grab) a boss 66 extending from the second leg 54. To prevent rattling noise from the hook and boss during operation of the toothbrush 10, the arms 60 can be mounted under some pre-tension using the natural stiffness of the material forming the frame bracket 50. Those of ordinary skill in the art will recognize other one-way latch mechanisms that can be utilized in lieu of the hook 64 and the boss 66.

Figure 7:
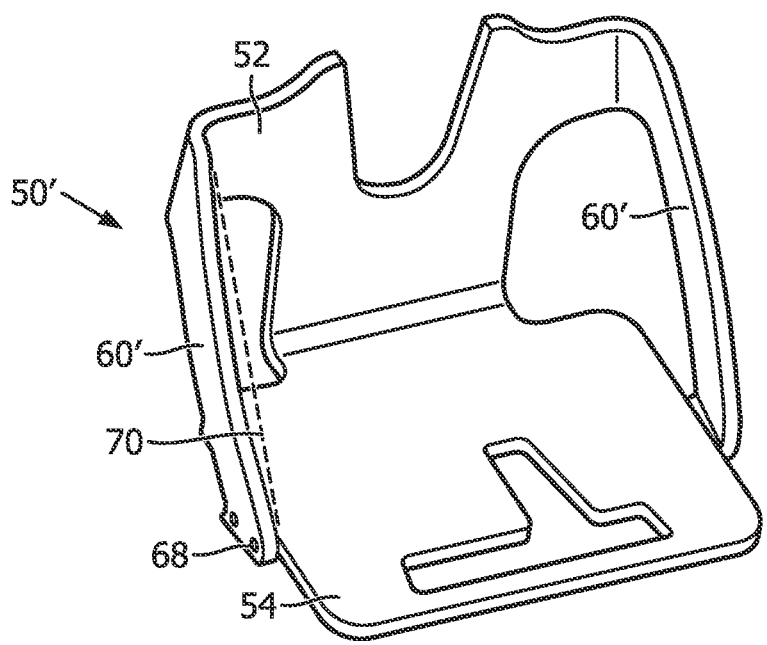
FIG. 7 is a front perspective view of a dual-stiffness bracket according to one embodiment disclosed herein.
Figure 8:
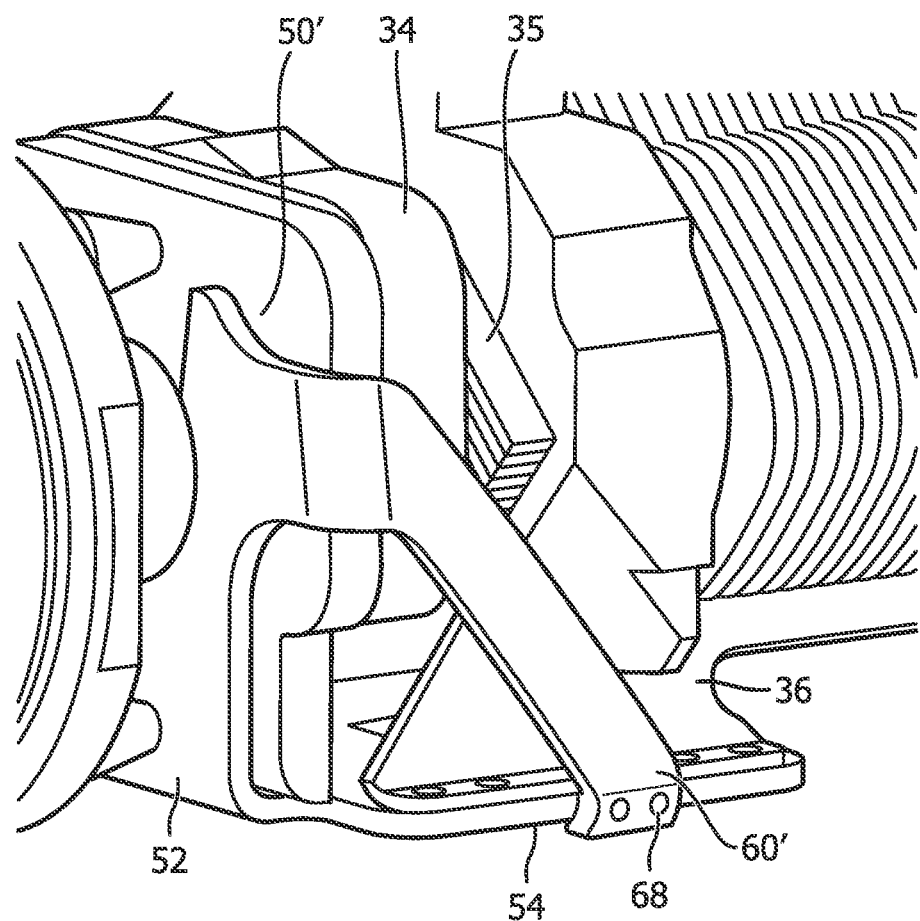
FIG. 8 is a perspective view of the dual-stiffness bracket of FIG. 7 installed in an electric toothbrush.

A mounting bracket 50' according to another embodiment is illustrated in FIG. 7, with the mounting bracket 50' shown installed in the relevant portion of the toothbrush 10 in FIG. 8. Similar to the mounting bracket 50, the mounting bracket 50' has one or more arms 60' (two shown in FIG. 7) that transversely extend from the first leg 52 to the second leg 54. However, unlike the arms 60, the arms 60' are affixed to both the leg 52 and the leg 54. For example, the arms 60' may be integrally formed with the leg 52 and attached to the leg 54 via welds 68 or some other manner of affixation, such as adhesive, bolts, etc. To provide relative decreased stiffness for the drop loads 26, the arms 60' are configured to buckle in the direction 28. To promote buckling, the arms 60' may be outwardly bent, bulged, bowed, or arched. To better appreciate the curvature in the arms 60', a dashed line 70 is shown in FIG. 7 that indicates where the top edge of the inner surface of the arm 60' would have been if the arm were not bent. Those of ordinary skill in the art will recognize other ways in which arms may be configured to more readily buckle in one direction. For example, the arms may be replaced in one embodiment with wires connected between the legs 52 and 54 that offer little or no resistance to bending in the direction 28 due to the drop loads 26, but which offer high tensile resistance in the opposite direction 24 to the brushing load 22.

Figure 9:
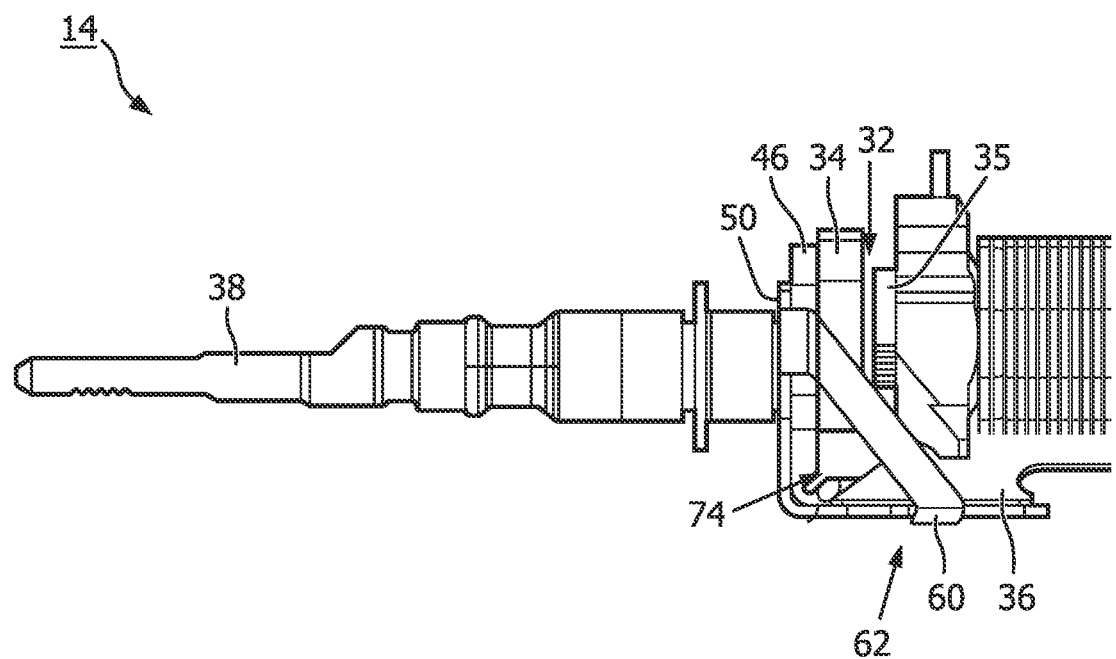
FIG. 9 is a side view of a handle portion of an electric toothbrush having a weakened bend in a back-iron component for a magnet according to one embodiment disclosed herein.

It is also noted that contribution to the bending stiffness may be provided by the back-iron component 46 for the magnet 34. In embodiment of FIG. 9, a back-iron component 46 is included that is formed as a generally L-shaped bracket that is weakened at a bend 74, e.g., by including substantially less cross-sectional thickness at the bend 74. In this way, the bend 74 may operate akin to a living hinge, thereby reducing stiffness and promoting flexibility in the back-iron component 46.

Figure 10:
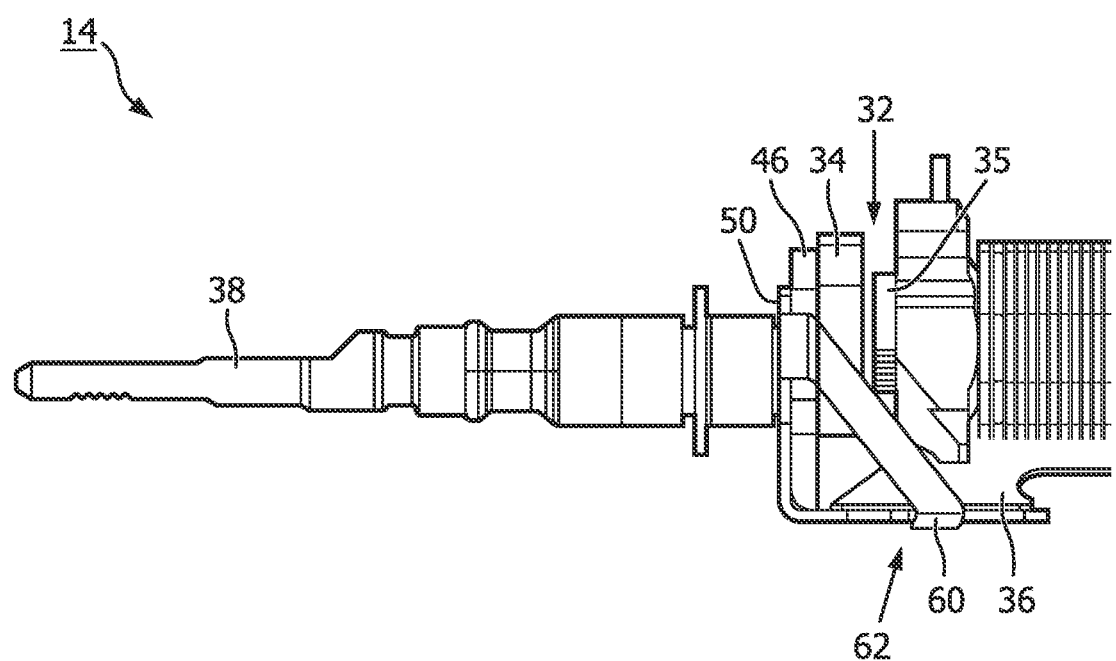
FIG. 10 is side view of a handle portion of an electric toothbrush having a back-iron component for a magnet arranged as a plate according to one embodiment disclosed herein.

In one embodiment, shown in FIG. 10, a back-iron component 46 is included and formed as a single plate instead of an L-shaped bracket. In this way, the bending stiffness in the handle portion 14 is provided by the bracket 50 without contribution by the back-iron component 46. An additional advantage to omitting the bottom part or base of the back-iron component 46 is that the inertia contribution of the back-iron component is decreased relative to L-shaped embodiments, thereby permitting increased freedom for designing or adding other components, without overly increasing the high for this portion of the assembly.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. An electric toothbrush comprising:
    a handle portion having a shaft configured to receive a brushing load from a bristled end of a brush head;
    a sensor assembly configured to determine a deflection proportional to the brushing load with respect to a first direction associated with the brushing load, the sensor assembly including an air gap and configured to determine the deflection based on changes in the air gap; and
    a mounting bracket connecting between opposite sides of the air gap, the mounting bracket configured with a first bending stiffness with respect to the first direction, and a second bending stiffness with respect to a second direction substantially opposite to the first direction, wherein the first bending stiffness is greater than the second bending stiffness.

2. The electric toothbrush of claim 1, wherein the sensor assembly includes a magnet and magnetic laminations on opposite sides of the air gap configured to create a magnetic field, wherein the brushing load is determinable based on changes in the magnetic field.

3. The electric toothbrush of claim 2, further comprising a back-iron component adjacent to the magnet configured to conduct the magnetic field.

4. The electric toothbrush of claim 3, wherein the back-iron component is arranged as a flat plate or as an L-shaped component with a weakened bend.

5. The electric toothbrush of claim 1, further comprising a compliant element configured to control an amount of the deflection in response to the brushing load.

6. The electric toothbrush of claim 5, wherein the mounting bracket includes a first leg coupled to the shaft and a second leg coupled to the compliant element.

7. The electric toothbrush of claim 6, wherein the mounting bracket includes one or more arms extending transversely between the first and second legs and a stop configured to prevent relative movement of the first and second legs in the first direction.

8. The electric toothbrush of claim 7, wherein the stop includes a hook formed on the one or more arms that is engageable with a boss extending from the mounting bracket.

9. The electric toothbrush of claim 6, wherein the mounting bracket includes one or more arms extending transversely between the first and second legs, wherein the one or more arms are configured to buckle in response to force applied to the first leg in the second direction.

10. The electric toothbrush of claim 9, wherein the one or more arms are bowed outwardly to promote buckling.

11. The electric toothbrush of claim 1, wherein the compliant element includes a V-spring.

12. The electric toothbrush of claim 1, wherein the mounting bracket is configured to attenuate forces applied to the mounting bracket in the second direction to protect a connection of the mounting bracket to the compliant element.

13. A method of operating an electric toothbrush comprising:
  receiving a brushing force at a bristled end of a brush head of the toothbrush, the brushing force causing a deflection in the electric toothbrush with respect to a first direction;
  measuring the deflection as a change in an air gap by a sensor assembly; and
  transferring applied forces between opposite sides of the air gap with a mounting bracket connected between the opposite sides of the air gap, wherein the mounting bracket is configured with a first bending stiffness with respect to the first direction, and a second bending stiffness with respect to a second direction generally opposite to the first direction, wherein the first bending stiffness is greater than the second bending stiffness.

14. The method of claim 13, further comprising controlling an amount of the deflection with a compliant element proportionally in response to the brushing force.

15. The method of claim 14, wherein the transferring includes attenuating forces applied to the mounting bracket in the second direction to protect a connection of the mounting bracket to the compliant element.

* * * * *